(12) United States Patent
Kuhn et al.

(10) Patent No.: US 6,406,401 B1
(45) Date of Patent: Jun. 18, 2002

(54) INFINITELY VARIABLE TOROIDAL DRIVE

(75) Inventors: Walter Kuhn, Friedrichshafen; Jürgen Wafzig, Eriskirch; Markus Hoher, Friedrichshafen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/673,447

(22) PCT Filed: May 3, 1999

(86) PCT No.: PCT/EP99/02983

§ 371 (c)(1),
(2), (4) Date: Oct. 16, 2000

(87) PCT Pub. No.: WO99/57460

PCT Pub. Date: Nov. 11, 1999

(30) Foreign Application Priority Data

May 6, 1998 (DE) .......................... 198 20 071

(51) Int. Cl.[7] .............................. F16H 15/38
(52) U.S. Cl. ........................................ 476/42
(58) Field of Search ............................ 476/42

(56) References Cited

U.S. PATENT DOCUMENTS

| | | | | |
|---|---|---|---|---|
| 1,774,175 A | * | 8/1930 | Erban .......................... 476/31 |
| 2,152,796 A | | 4/1939 | Erban .......................... 74/208 |
| 3,087,348 A | | 4/1963 | Kraus .......................... 74/200 |
| 3,739,658 A | | 6/1973 | Scheiter ....................... 74/730 |
| 4,893,517 A | | 1/1990 | Nakano ........................ 74/200 |
| 4,968,289 A | | 11/1990 | Nakano ........................ 74/200 |

FOREIGN PATENT DOCUMENTS

| | | |
|---|---|---|
| DE | 42 13 415 A1 | 10/1992 |
| DE | 197 32 084.8 | 7/1997 |
| DE | 197 17 382 | 11/1997 |
| DE | 197 36 833 A1 | 2/1999 |
| DE | 197 54 725 A1 | 6/1999 |
| EP | 0 394 944 A2 | 10/1990 |
| FR | 964322 | 8/1950 |
| WO | 99/05434 | 2/1999 |

OTHER PUBLICATIONS

Japanese Abstract, vol. 099, No. 005 dated May 31, 1999 & JP 11 051137A to Nippon Seiko KK dated Feb. 23, 1999.

* cited by examiner

Primary Examiner—Allan D. Herrmann
(74) Attorney, Agent, or Firm—Davis & Bujold, P.L.L.C.

(57) ABSTRACT

The toroidal drive has an input shaft (3) and a torque shaft (20) positioned coaxially thereto as well as two input discs (5, 12) and two output discs (6, 11) associated in pairs to the input discs. Between one of the input discs (5) and an axial flange (9), which is firmly connected with the input shaft (3) and upon which supports itself the input disc (5) is not pressurized by a contact-pressure device (4), one universal bearing (18) is provided which assumes both the axial support and the radial support of said input disc (5).

4 Claims, 1 Drawing Sheet

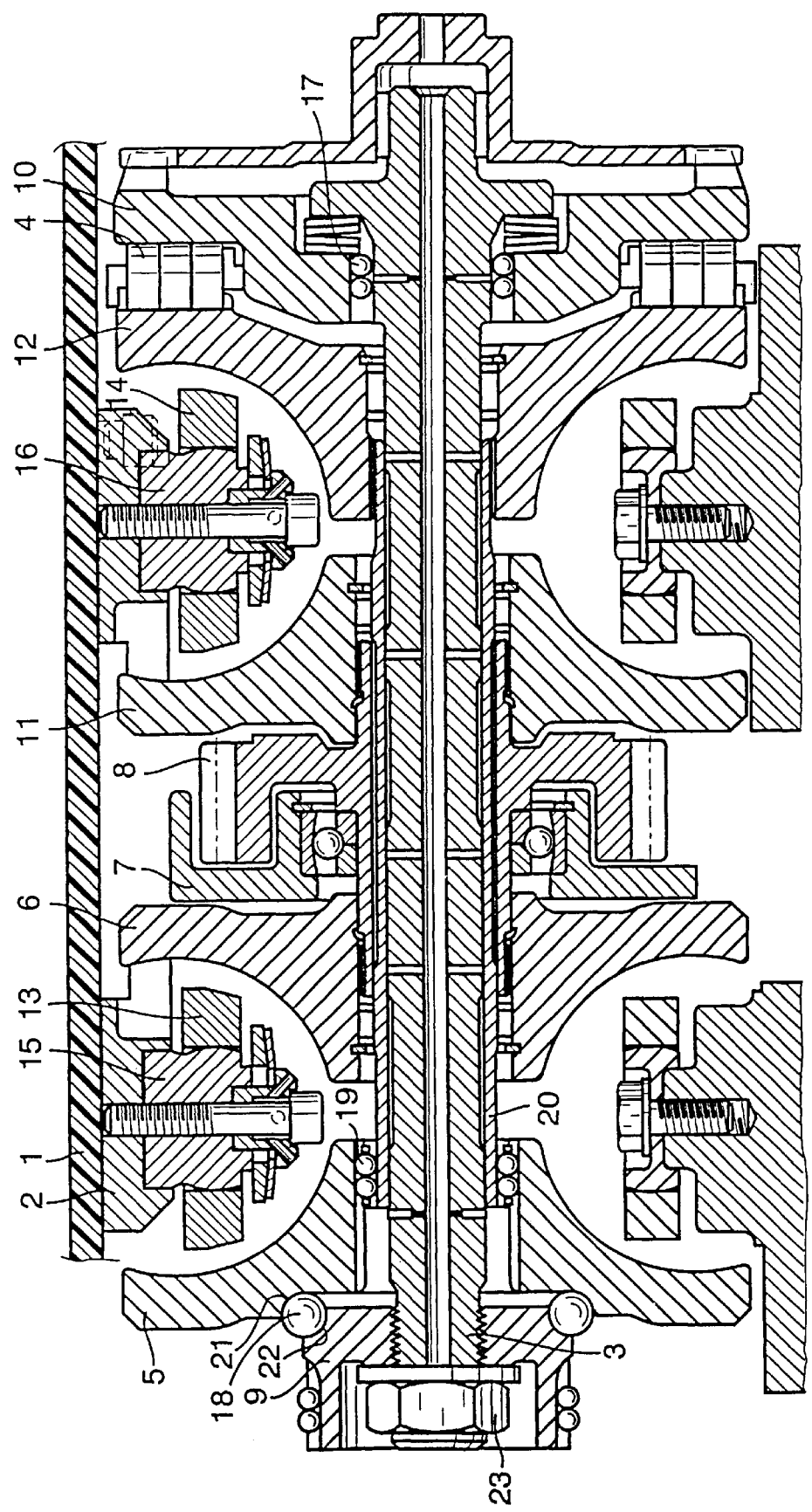

INFINITELY VARIABLE TOROIDAL DRIVE

FIELD OF THE INVENTION

The invention relates to an infinitely variable toroidal drive.

BACKGROUND OF THE INVENTION

Such an infinitely variable toroidal drive usually has input and output discs coaxially disposed relative to a common shaft which are arranged in pairs and have toroidally shaped inner surfaces, the same as friction wheels placed between the pairs of input and output discs. The friction wheels are in frictional contact both with the input and output discs and transmit to the output disc the torque transmitted to them by the input disc, the rotational speed of the friction wheels being higher the larger the distance between their contact point with the input disc and the axis of rotation. Accordingly, by swiveling the friction wheels, it is infinitely and arbitrarily possible to adjust the rotational speed of the output disc. To this end, the axes of rotation of the friction wheels are supported in a carrier which can be controlled via a swiveling device.

The basic principle of such an infinitely variable toroidal drive has already been described in U.S. Pat. No. 2,152,796 which was published in the year 1939. In this publication are provided two pairs of concave input and output discs between which are placed pivotably supported friction wheels so that a torque transmitted via one input shaft to the input discs and the friction wheels, according to the relative position of the friction wheels with a reduction ratio depending thereon, is fed via the output discs, a gear wheel step and a hollow shaft to a summarizing transmission in the form of a planetary transmission. The web of the planetary transmission drives an output shaft which is connected with the driving wheels, e.g. of a motor vehicle. The output shaft can be situated parallel with and spaced from the input shaft. The output gear wheel and the two output discs are rotatably mounted on a sleeve supported on its ends in bearing brackets. The arrangement of the bearing brackets between each input and output disc requires a sufficiently large installation space between the discs.

The transmission according to U.S. Pat. No. 3,739,658 likewise has a pull-and-push variator with two input and output discs disposed in pairs between which are situated pivotably supported friction wheels. In this construction, a bearing bracket is present which is a component part of the housing and is horizontally disposed spatially between the two output discs. The power flowing from the output discs is fed to a hollow shaft, via a planetary transmission, which, in addition, acts as a differential. The hollow shaft is non-rotatably connected with the output gear wheel and is rotatably held in the bearing bracket by ball bearings.

The output gear wheel is in driving connection with one gear wheel which is non-rotatably fastened on the housing of a torque converter. The latter drives the output shaft of the transmission. The arrangement of the torque converter at the entrance of the output shaft requires a relatively large axial distance between input and output shafts of the transmission. Utilization is thereby sharply limited, since the installation space needed is not always available.

U.S. Pat. No. 4,893,517 has disclosed an infinitely variable toroidal drive having one input shaft which transverses a housing. The housing is divided by means of a partition wall into two cavities in each of which is situated one input disc and one output disc opposite thereto with friction wheels therebetween wherein both of the input discs and the output discs in the two cavities lie on a common axis toward which the friction wheels can be swivelled to obtain the desired speed ratio. Both pairs of input discs and output discs are situated in the cavities in mirror symmetry to each other in a manner such that the two output discs lie adjacent each other on opposite sides of the partition wall separating the two cavities from each other and in which a gear wheel is supported which is actuated by the two output discs jointly with the output torque.

The Applicant's patent application No. DE 197 32084.8 describes an infinitely variable toroidal drive in which the input shaft is surrounded by a torque shaft disposed coaxially thereto; the input shaft extends through the entire infinitely variable drive and is provided at its end with an axial disc. With the axial disc is associated a contact-pressure device which pressurizes a first input disc of a transmission unit in direction to the appertaining output disc thereof. The input disc of the second transmission unit supports itself via an axial bearing on a second axial disc and via a radial bearing on the input shaft.

Between both transmission units is provided a cup-shaped bearing bracket member in which is situated one gear wheel actuated by the two output discs of both transmission units and which meshes with an output gear wheel of an output shaft. The bracket bearing member forms, together with an upper and a lower frame strap, a holding frame wherein the frame strap carries upper and lower transverse yokes where are situated the carriers for the friction wheels which can pivot on pre-selected planes in order to transmit the torque from the respective appertaining input disc with an infinitely variable ratio to the appertaining output disc of the transmission unit.

SUMMARY OF THE INVENTION

The problem on which this invention is based is to reduce the construction cost of such an infinitely variable transmission and lower the cost of production.

The invention solves the stated problem in a generic infinitely variable toroidal drive incorporating the present invention.

The advantage that can be obtained with the invention is that the use of a universal bearing on which an input disc absorbs both radial and axial forces makes it possible to shorten the total length of the infinitely variable transmission by eliminating the hitherto usual raised axial support. The elimination of the formerly usual radial bearing of the input disc further makes it possible to displace the locking system (ball-spline) obtained with the aid of balls with the torque shaft to a less loaded place of the input disc whereby the service life of the transmission is increased.

BRIEF DESCRIPTION OF THE DRAWINGS

The invention is explained in detail below with reference to a drawing where and advantageous embodiment is shown.

In the single FIGURE is shown a section through an infinitely variable transmission, there being described below only the parts essential for the understanding of the invention.

DESCRIPTION OF THE PREFERRED EMBODIMENTS

The friction wheel transmission 1 (or toroidal drive) has one input shaft 3 connected with a starting element (not shown) such as a torque converter or a wet-running starting clutch of a prime mover of a motor vehicle. The transmission contains two units situated coaxially relative to the input shaft 3. One unit has one input disc 5 and one output disc 6 whose surfaces facing each other are of toroidal shape; the other unit has one input disc 12 and one output disc 11 whose surfaces facing each other likewise are of toroidal shape. In each unit are preferably provided two friction wheels (not shown) which are fastened on a swiveling carriers; the friction wheels are in frictional engagement with both surfaces facing them of the input discs 5, 12 and of the output discs 6, 11, the friction wheels of each unit being symmetrically arranged relative to the axis of the input shaft 3.

If the friction wheels are now inclined by the swiveling device (not shown separately), relative to the longitudinal axis of the input shaft 3, the contact points of the periphery of the friction wheels move, whereby the reduction ratio between one input and one output speed can be adjusted continuously, i.e. infinitely.

The discs 5, 6, 11, 12 are supported upon a torque converter 20 which is slightly movable in axial direction relative to the input shaft. The input disc 5 of one unit is non-rotatably connected with the torque shaft 20 but supported axially sliding upon it via a spherical locking system 19 (ball-spline). The input disc 12 of the other unit is also non-rotatably connected with the torque shaft 20 by engaging gears. Both output discs 6, 11 of both transmission units are disposed with mirror symmetry relative to each other and adjacent each other and are situated upon a common bushing, the output discs 6, 11 being firmly connected with a gear wheel 8 which rotatably surrounds the torque shaft 20. A torque transmitted from one input disc 5 to the output disc 6 and a torque transmitted by the other input disc 12 to the output disc 11 is transmitted by the two output discs non-rotatably connected with the bushing to the gear wheel 8 which meshes with a gear wheel (not shown) of an outputs shaft.

With 4 is designated a roller-shaped contact-pressure device which is provided between the input disc 12 with a cam plate and a disc 10 with a cam plate and which in axial direction is movably supported upon the input shaft 3 and non-rotatably connected with it that pressurizes the input disc 12 in axial direction toward the output disc 11 with the aid of the contact-pressure device 4.

With 9 is designated an axial flange upon which the input disc 5 supports itself via a universal bearing 18 and which serves both to transmit the axial force from the contact-pressure device 4 to the input disc 5 and also to move the torque. In addition, the input disc 5, via a locking system (ball-spline) 19 which ensures a non-rotatable connection with the torque shaft 20, is axially movably supported on the latter.

The universal bearing 18, which substitutes the conventional axial bearing and the conventional radial bearing of the input disc 5, absorbs all radial and axial forces that act upon the input disc 5. It is preferably shaped as ball bearing which engages on one side in a semicircular recess 21 integrated in the input disc and, on the other side, in a complementarily formed recess 22 in the axial flange 9. The two recesses are advantageously vertically offset relative to each other. Separate bearing rings for the universal bearing 18 are thereby unnecessary whereby the installation space can be reduced. Via the axial flange 9, the prestress force screwed on by a nut 23 is also transmitted; the axial flange supporting the nut against the variator.

With 7 is designated a cup-shaped bearing bracket member in which is supported the gear wheel 8 and which separates from each other the two transmission units. With 13, 14 are designated the upper transverse yokes and with 15 and 16 pivots for fixing the transverse yokes in two directions. The pivots create the connection to the holding frame 2.

The carriers (not shown) of the friction wheels are supported in the transverse yokes.

| Reference numerals |
| --- |
| 1 transmission |
| 2 holding frame |
| 3 input shaft |
| 4 contact-pressure device |
| 5 input disc |
| 6 output disc |
| 7 bracket bearing member |
| 8 gear wheel |
| 9 axial flange |
| 10 disc with cam plate |
| 11 output disc |
| 12 input disc |
| 13 upper transverse yoke |
| 14 upper transverse yoke |
| 15 pivot |
| 16 pivot |
| 17 locking system |
| 18 universal bearing |
| 19 locking system |
| 20 torque shaft |
| 21 recess |
| 22 recess |
| 23 nut |

What is claimed is:

1. An infinitely variable toroidal drive having:
   an input shaft (3) defining an axis of rotation;
   a torque shaft (20) coaxially disposed relative thereto;
   two input discs (5, 12) with toroidal shaped inner surfaces coaxial with said input shaft;
   two output discs (6, 11) with toroidal shaped inner surfaces coaxial with said input shaft, each input disc and an output disc forming a pair with both output discs being disposed with mirror symmetry adjacent each other,
   a contact-pressure device (4) for one of said input discs in order to apply pressure to the input discs in a direction toward said output discs,
   a universal bearing (18) is provided between the other of the input discs (5) and an axial flange (9) firmly connected with said input shaft (3), said bearing providing both axial and the radial support of said other input disc (5); and
   a gear wheel between said output discs;
   wherein said universal bearing (18) has balls which are guided between a recess (21) integrated in said other input disc (5) and a complementarily recess (22) in said axial flange (9).

2. The toroidal drive according to claim 1, wherein said recesses (21, 22) are constructed in the shape of from about a quarter circle to about a semicircle.

3. The toroidal drive according to claim 2, wherein said two recesses (21, 22) are disposed radially offset relative each other about said axis.

4. The toroidal drive according to claim 1, wherein said axial flange (9) serves both to drive the torque from a starting element of a prime mover of a motor vehicle to said input shaft (3) and to transmit the axial force from said contact-pressure device (4) to said input disc (5).

\* \* \* \* \*